US012593760B2

(12) United States Patent
Forde et al.

(10) Patent No.: US 12,593,760 B2
(45) Date of Patent: Apr. 7, 2026

(54) TREE GUARD ASSEMBLY

(71) Applicant: Dr Tree Good LLC, Argusville, ND (US)

(72) Inventors: Renee Forde, Argusville, ND (US); Daryl Ruter, Clear Lake, IA (US)

( * ) Notice: Subject to any disclaimer, the term of this patent is extended or adjusted under 35 U.S.C. 154(b) by 0 days.

(21) Appl. No.: 18/335,985

(22) Filed: Jun. 15, 2023

(65) Prior Publication Data

US 2024/0415073 A1      Dec. 19, 2024

(51) Int. Cl.
*A01G 13/27* (2025.01)
*A01G 13/28* (2025.01)

(52) U.S. Cl.
CPC ............. *A01G 13/27* (2025.01); *A01G 13/28* (2025.01)

(58) Field of Classification Search
USPC ........ 47/32.6, 32, 32.4, 32.5, 32.7, 32.8, 65, 47/65.5, 66.1, 42, 43
See application file for complete search history.

(56) References Cited

U.S. PATENT DOCUMENTS

| | | | | | |
|---|---|---|---|---|---|
| D21,074 S | * | 9/1891 | Milliken | .......................... | 256/48 |
| D21,075 S | * | 9/1891 | Milliken | ....................... | D25/128 |
| 494,874 A | * | 4/1893 | Majola | ................... | A01G 13/28 |
| | | | | | 47/32.4 |
| 3,415,013 A | * | 12/1968 | Galbraith | ................. | A01G 9/28 |
| | | | | | 47/33 |

| | | | | | |
|---|---|---|---|---|---|
| 4,716,680 A | * | 1/1988 | Whitcomb | ............. | A01G 9/029 |
| | | | | | 47/73 |
| 4,796,383 A | | 1/1989 | Inoue | | |
| 5,291,708 A | * | 3/1994 | Johnson | ................... | E04H 17/16 |
| | | | | | 47/33 |
| 7,140,149 B2 | | 11/2006 | Searle | | |
| 7,640,695 B2 | * | 1/2010 | Bonahoom | .......... | A01G 23/043 |
| | | | | | 47/65.5 |
| 8,132,367 B2 | * | 3/2012 | Cottier | ..................... | A01G 9/02 |
| | | | | | 47/83 |
| 8,272,163 B2 | * | 9/2012 | Dubner | ................. | E04D 11/002 |
| | | | | | 47/65.9 |
| 10,568,276 B1 | * | 2/2020 | Fakhari | .................... | A01G 9/28 |
| 11,230,853 B2 | * | 1/2022 | Speciale | .................. | E04H 7/04 |
| 2004/0098912 A1 | * | 5/2004 | Searle | ...................... | A01G 9/02 |
| | | | | | 47/65.5 |
| 2005/0155287 A1 | * | 7/2005 | Phillips | .................... | A01G 9/02 |
| | | | | | 47/32.7 |
| 2010/0242357 A1 | * | 9/2010 | Vogler | ..................... | A01G 9/28 |
| | | | | | 47/33 |
| 2012/0174481 A1 | * | 7/2012 | Toro | .......................... | A01G 9/02 |
| | | | | | 47/65.5 |

(Continued)

FOREIGN PATENT DOCUMENTS

| | | | | | |
|---|---|---|---|---|---|
| AU | 3036095 A | * | 3/1996 | | |
| AU | 2010100191 A4 | * | 4/2010 | .............. | A01G 9/02 |

(Continued)

*Primary Examiner* — Andrea M Valenti
(74) *Attorney, Agent, or Firm* — Fargo Patent & Business Law; Thomas Kading

(57) ABSTRACT

A tree guard assembly includes a plurality of corner sections, each corner section including a first wall with a first flange comprising at least one flange aperture, the first wall includes an opening configuration pattern and a second wall with a second flange including at least one flange aperture, the second wall meets the first wall at a corner.

11 Claims, 6 Drawing Sheets

(56) References Cited

U.S. PATENT DOCUMENTS

| | | | | |
|---|---|---|---|---|
| 2013/0167440 A1* | 7/2013 | Fischer | ................. | A01G 9/033 |
| | | | | 47/65.9 |
| 2014/0130411 A1* | 5/2014 | Topping | ................... | A01G 9/28 |
| | | | | 47/66.1 |
| 2018/0110193 A1* | 4/2018 | Marmolejo | ............. | A01G 9/02 |
| 2021/0059125 A1 | 3/2021 | Allen | | |
| 2023/0309463 A1* | 10/2023 | Chen | ........................ | A01G 9/12 |
| | | | | 47/46 |

FOREIGN PATENT DOCUMENTS

| | | | | | |
|---|---|---|---|---|---|
| CN | 111742749 B | | 12/2021 | | |
| DK | 160851 | * | 4/1991 | | |
| EP | 0249027 A1 | * | 12/1987 | .............. | A01G 9/02 |
| EP | 2253199 A2 | * | 11/2010 | .............. | A01G 1/08 |

* cited by examiner 22A, 22B, 22C, 22D

TREE GUARD ASSEMBLY

CROSS REFERENCE TO RELATED APPLICATION[S]

None

BACKGROUND

The present disclosure relates to structures to protect trees.

Young trees are very susceptible to animals and need to be protected during the first few years of their life. Such animals as rabbits and deer are attracted to their bark given that it is still soft and easy to eat. Various tree guards, tree wraps, and bark protectors are available to defend trees and plants from animals as well as weed trimmers, and wind damage. Such conventional guards may be difficult to install and are often disposed of once used.

SUMMARY

A tree guard assembly according to one disclosed non-limiting embodiment of the present disclosure includes a plurality of corner sections that are assembled to form a structure, each corner section includes an opening configuration pattern.

A further embodiment of any of the foregoing embodiments of the present disclosure includes wherein the opening configuration pattern varies along a height.

A further embodiment of any of the foregoing embodiments of the present disclosure includes wherein the opening configuration pattern comprises a multiple of shapes.

A further embodiment of any of the foregoing embodiments of the present disclosure includes wherein the opening configuration pattern comprises a solid lower section band.

A further embodiment of any of the foregoing embodiments of the present disclosure includes wherein the opening configuration pattern comprises a solid upper section band.

A further embodiment of any of the foregoing embodiments of the present disclosure includes wherein the multiple of shapes increase in size toward a middle section of each corner sections.

A further embodiment of any of the foregoing embodiments of the present disclosure includes wherein each of the plurality of corner sections comprise a first wall and a second wall that meet at a corner.

A further embodiment of any of the foregoing embodiments of the present disclosure includes a respective flange along each wall, each flange comprises a multiple of flange apertures.

A further embodiment of any of the foregoing embodiments of the present disclosure includes an aperture arrangement that extends along at least a portion of each corner.

A tree guard assembly according to one disclosed non-limiting embodiment of the present disclosure includes a plurality of corner sections that are assembled to form a structure, each of the plurality of corner sections comprise a first wall and a second wall that meet at a corner, an upper ledge adjacent an upper portion of the first wall and the second wall and a lower ledge adjacent a lower portion of the first wall and the second wall.

A further embodiment of any of the foregoing embodiments of the present disclosure includes an aperture arrangement that extends parallel to the corner of each of the plurality of corner sections.

A further embodiment of any of the foregoing embodiments of the present disclosure includes wherein the aperture arrangement is sized to receive a stake so that two or more corner sections are stackable, the lower ledge adjacent a lower portion of the first wall and the second wall of an upper one of the plurality of corner sections stackable upon the upper ledge adjacent an upper portion of the first wall and the second wall of a lower one of the plurality of corner sections.

A further embodiment of any of the foregoing embodiments of the present disclosure includes a respective flange along each wall parallel to the corner, each flange comprises a multiple of flange apertures.

A method of assembling a tree guard assembly according to one disclosed non-limiting embodiment of the present disclosure includes securing a plurality of identical corner sections at a respective flange of each of the plurality of corner sections to form a rectilinear structure, each of the plurality of identical corner sections includes an opening configuration pattern that varies along a height.

A further embodiment of any of the foregoing embodiments of the present disclosure includes securing a respective flange of each of the adjacent plurality of corner sections through a multiple of flange apertures within each respective flange.

A further embodiment of any of the foregoing embodiments of the present disclosure includes stacking at least two of the plurality of identical corner sections such that a lower ledge on a lower of a first wall and a second wall of an upper one of the plurality of corner sections are abuts an upper ledge on an upper of a first wall and a second wall of a lower one of the plurality of corner sections.

A further embodiment of any of the foregoing embodiments of the present disclosure includes inserting a stake through an aperture arrangement that extends parallel to the corner of each corner formed by the plurality of corner sections.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
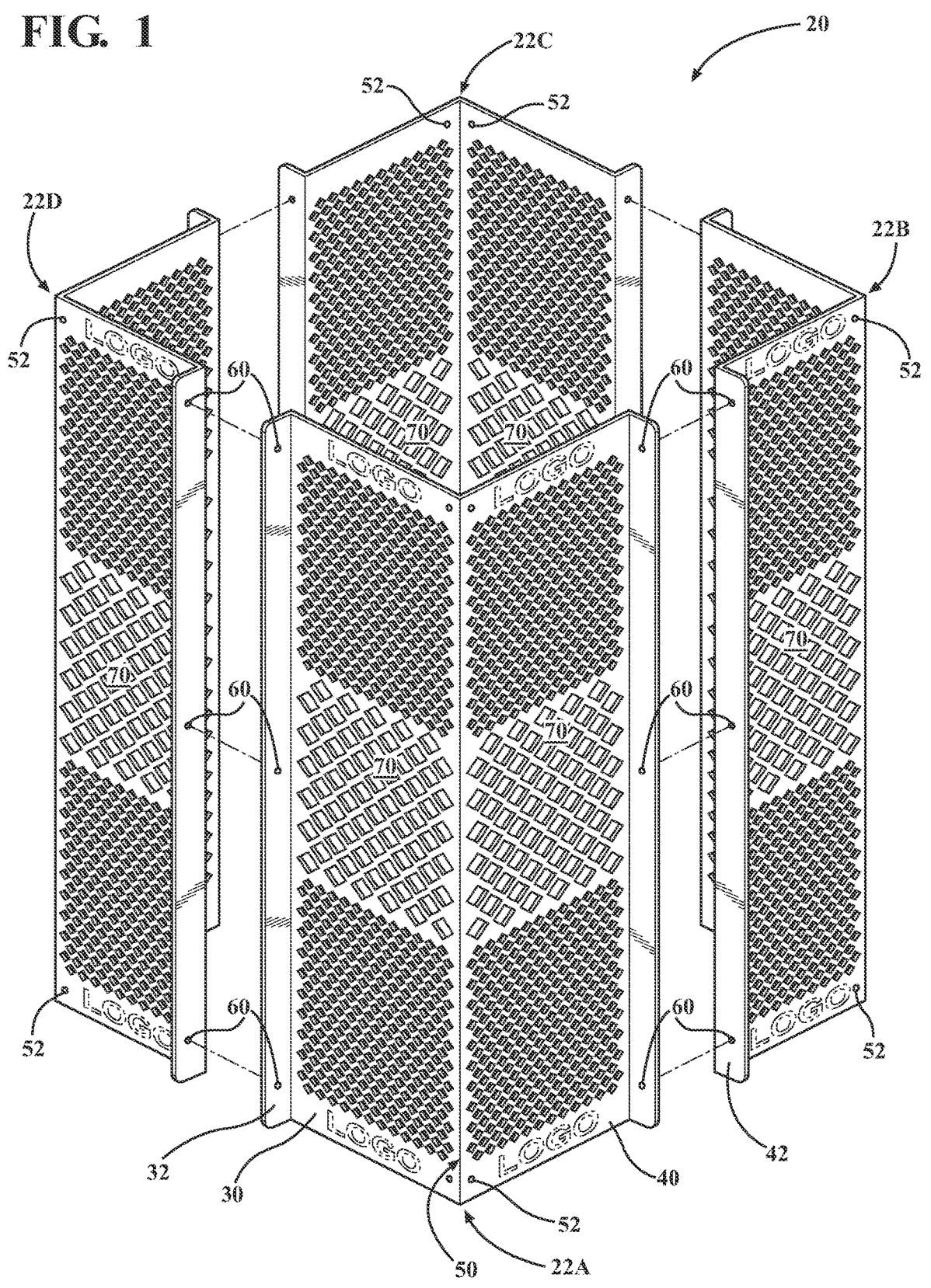
FIG. 1 is an exploded view of a tree guard assembly according to one disclosed non-limiting embodiment.

FIG. 1 schematically illustrates a tree guard assembly 20 to defend trees and plants from, deer, squirrels, rabbits, rodents, weed trimmers, construction damage, etc. The tree guard assembly 20 may be of a rectilinear, e.g., square, diamond, polygonal shape manufactured of cardboard, plastics, stainless steel, steel, aluminum, depending on the appearance and weight preferences in the intended use.

Figure 2:
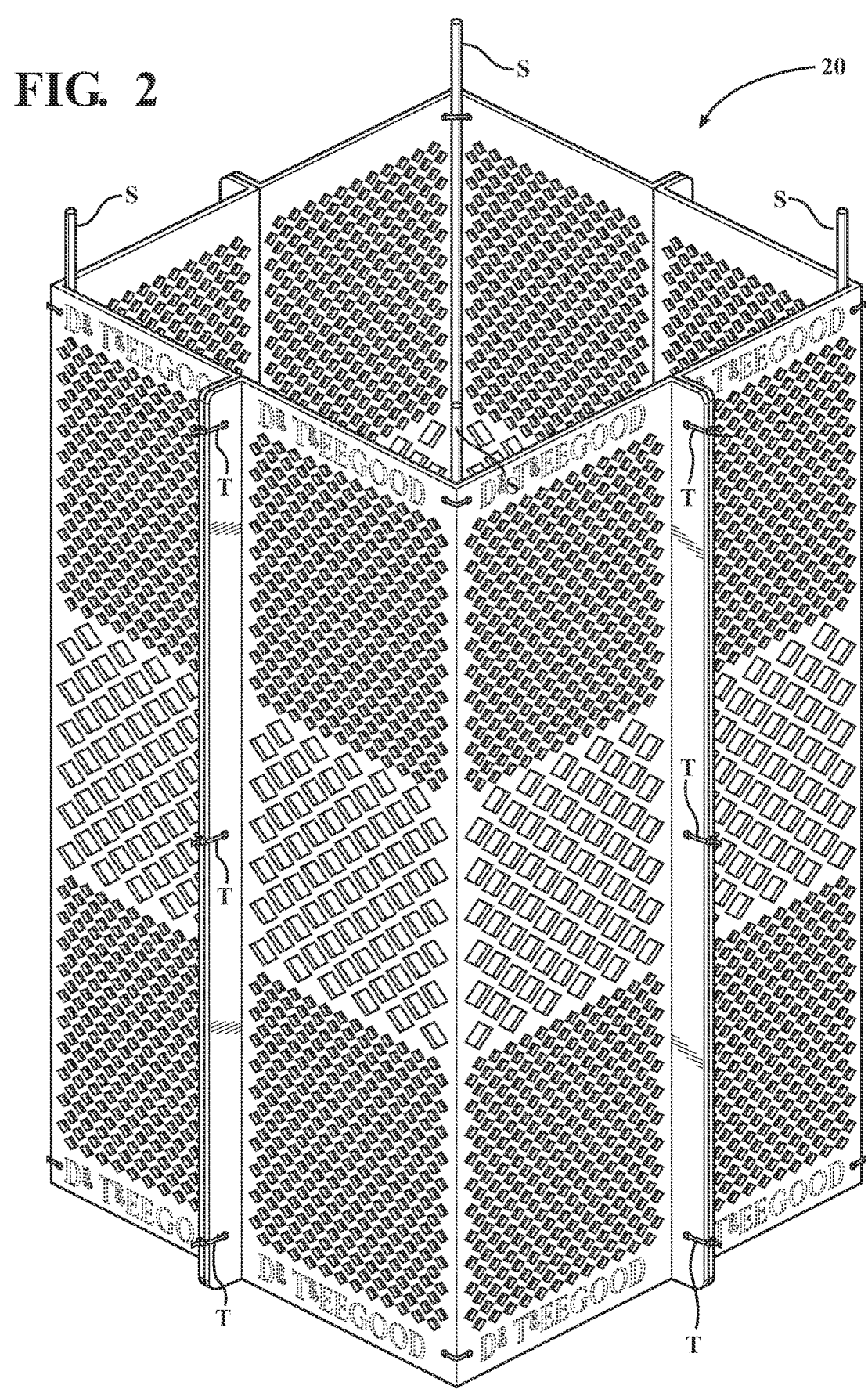
FIG. 2 is a perspective view of the tree guard assembly of FIG. 1 in an assembled configuration.

The assembled tree guard assembly 20 may be of a significant size which, in one embodiment, may be 24 inches×24 inches×48 inches, yet one person can readily assemble the structure (FIG. 2). The assembled tree guard assembly 20, in another embodiment, may be 30 inches tall×32 inches wide in a square or circle shape. The tree guard assembly 20 may include rounded edges and be painted, powder-coated or molded to suit the particular application.

Figure 3:
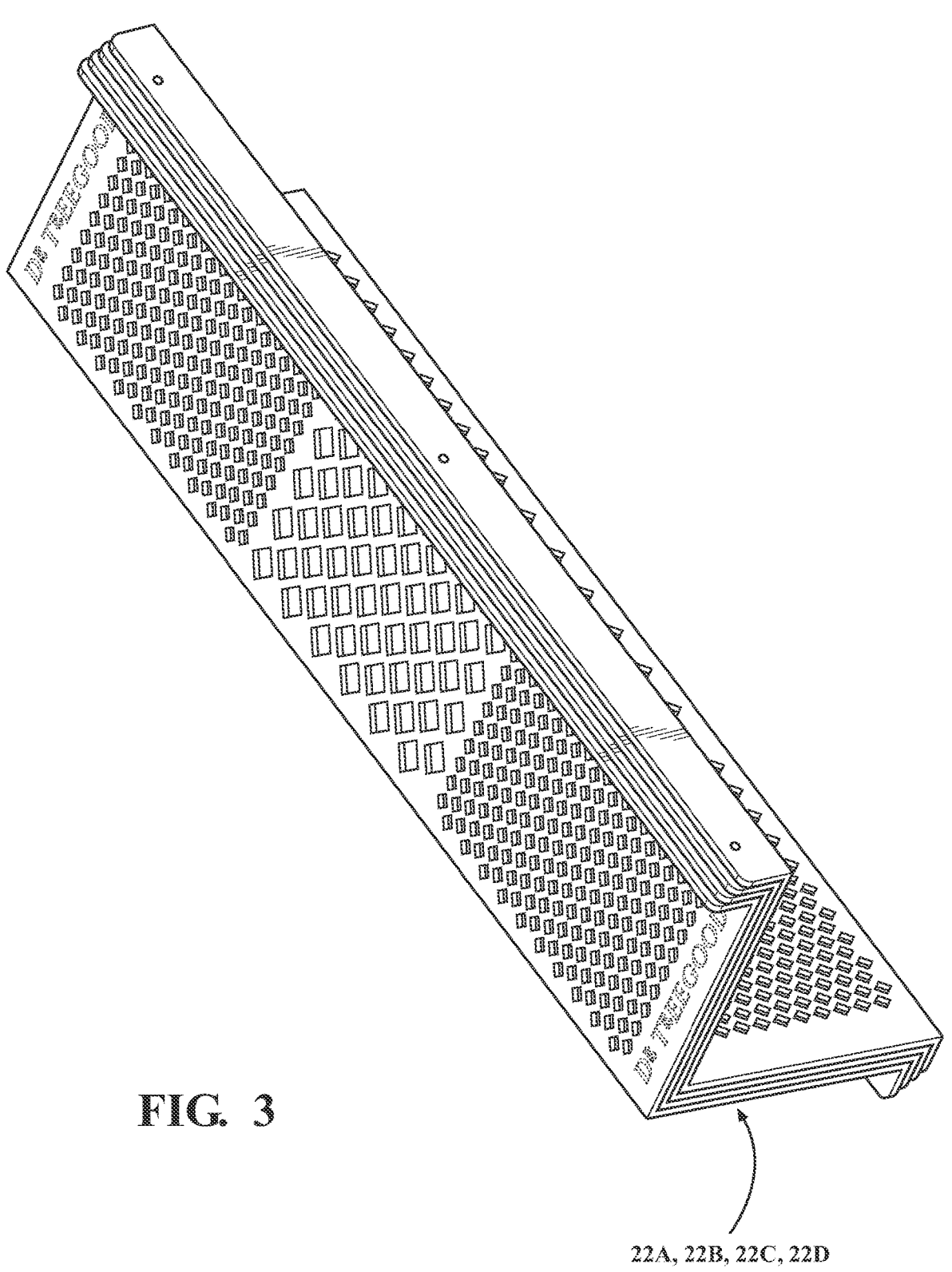
FIG. 3 is a perspective view of a plurality of corner sections of the tree guard assembly in a stacked configuration.

The tree guard assembly 20 may be formed of identical corner sections 22A, 22B, 22C, 22D that are assembled together around a tree or plant to provide protection thereof. Each corner section 22A, 22B, 22C, 22D are readily stored together in a stacked configuration (FIG. 3) to provide a space saving storage arrangement. Many tree guard assemblies 20 are thereby effortlessly stored, packaged, shipped, etc.

Although each corner section 22A, 22B, 22C, 22D will be described in detail, it should be appreciated that as each corner section 22A, 22B, 22C, 22D is identical, such description is applicable to each.

Each corner section 22A, 22B, 22C, 22D generally includes a first wall 30 and a second wall 40 that meet at a corner 50 such that the walls 30, 40 are approximately perpendicular to each other. The walls 30, 40 are essentially rectangular. Each corner 50 may include an aperture arrangement 52 at least part way along the length thereof and particularly along an upper section and a lower section. The aperture arrangement 52 may receive a "zip tie", tie wire, rope, etc., to provide support for stakes S that are affixed at each corner 50 to increase stability of the tree guard assembly 20 and young trees. The tree within the tree guard assembly 20 may also have straps that tie back towards the aperture arrangement 52 and/or the stakes S for further support.

The first wall 30 and the second wall 40 each terminate with a respective flange 32, 42 that abut adjacent flanges of a respective adjacent corner section 22A, 22B, 22C, 22D. Each flange 32, 42 extends perpendicular to the associated wall and may each be approximately two (2) inches in width. That is, the flange 32, 42 provides for the interface between each adjacent corner section 22A, 22B, 22C, 22D. Each flange 32, 42 may include a multiple of flange apertures 60 (e.g., three (3) shown) along the length thereof. In one embodiment, each of the multiple of flange apertures 60 may be 0.27 inches in diameter to receive a "zip tie", tie wire, rope, bolt, etc., to assemble the corner sections 22A, 22B, 22C, 22D together to form the tree guard assembly 20 around the tree or plant to provide protection thereof (FIG. 2). Any corner section 22A, 22B, 22C, 22D may be temporarily removed from the assembly to gain access to the tree.

Figure 4:
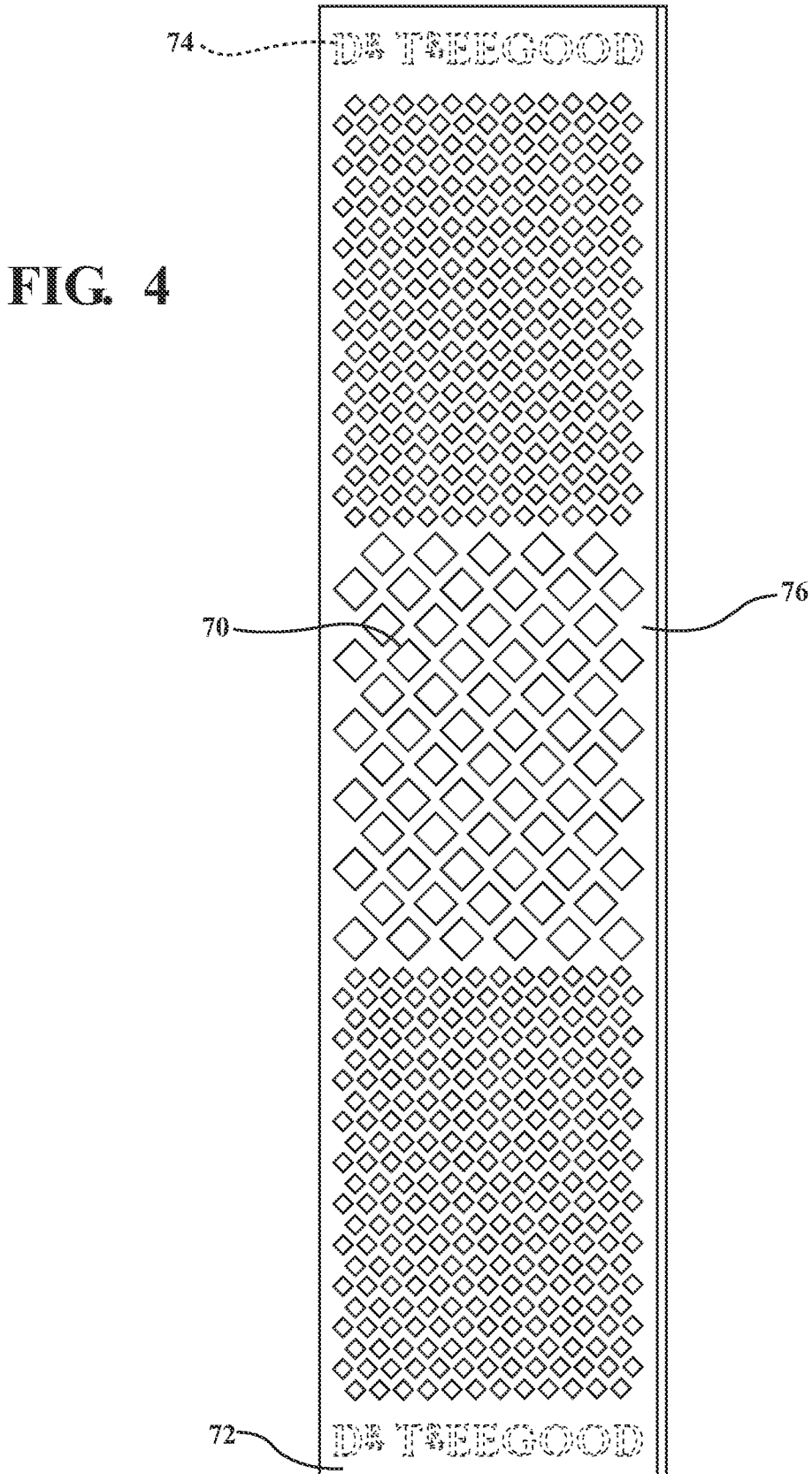
FIG. 4 is a perspective view of a corner section of the tree guard assembly.

The first wall 30 and the second wall 40 each include an opening configuration pattern 70. The opening configuration pattern 70 in one embodiment may be a diamond pattern in which the size thereof varies along the height of the walls 30, 40. In one example, a lower section band 72, and an upper section band 74, each for example, three (3) inches in height, may be solid and provide a location for a logo or other identification (FIG. 4) as well as to, for example, contain mulch, keep out voles, and provide stability to the structure.

The opening configuration pattern 70 in this embodiment may include diamonds of about 0.5 inches in height adjacent to the lower section band 72, and the upper section band 74, then transition to diamonds of about two (2) inches in height toward the middle section 76 each of the first wall 30 and the second wall 40. The opening configuration pattern 70 may provide specific protection from voles, rabbits, and deer. The transition may be graduated, i.e., the diamonds slowly increase in size 0.5, 0.6, 0.7, etc., may change size in steps, i.e., the diamond jump from 0.5 to 2 inches, and or combinations or variations thereof. In this embodiment, each aperture of the opening configuration pattern 70 is less than 2 inches×2 inches to prevent rabbits from passing. Although a particular diamond pattern is illustrated it should be appreciated that other shapes, squares, triangle, circles, may be utilized as well as other patterns to provide air flow to the tree.

Figure 5:
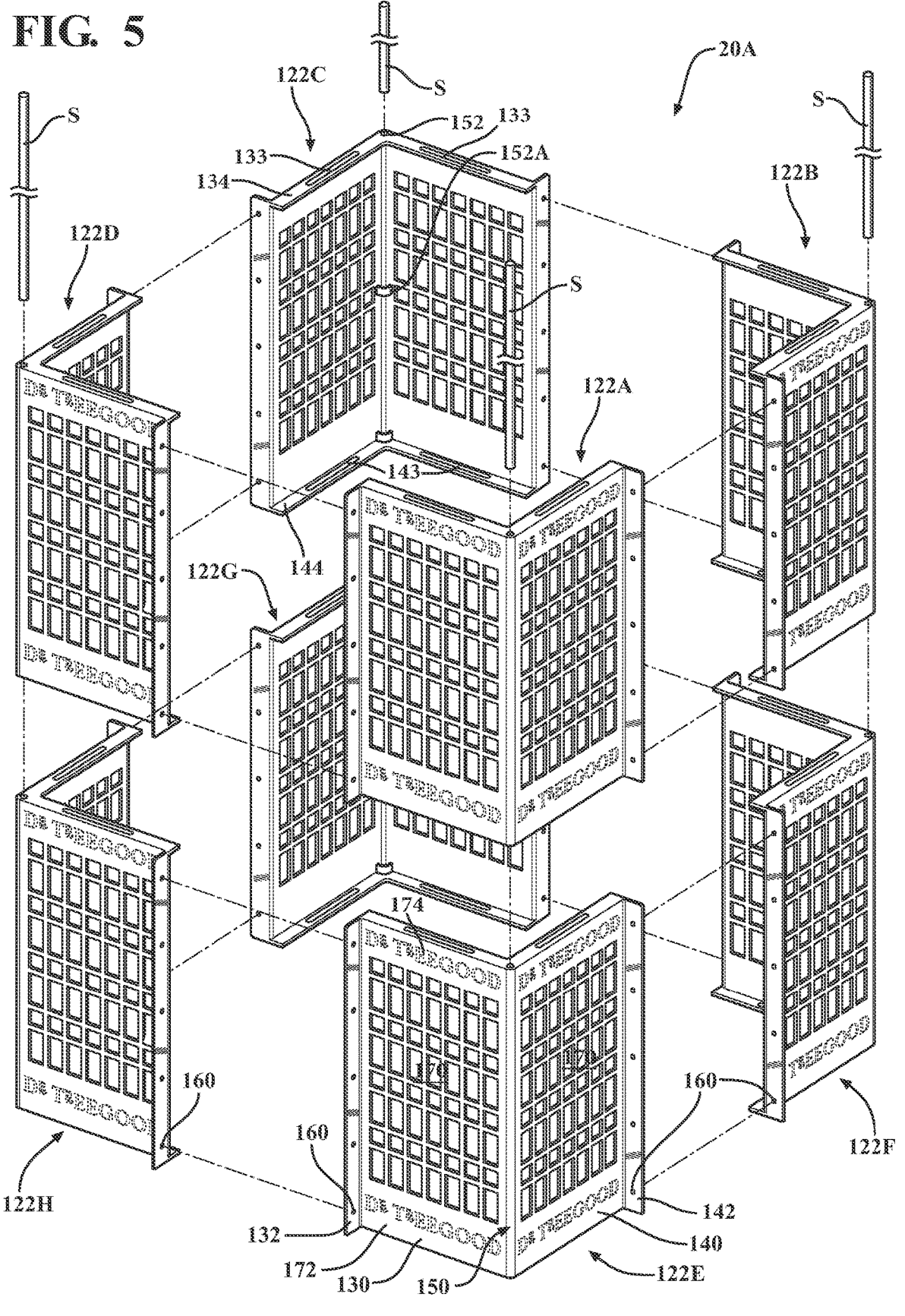
FIG. 5 is an exploded view of a tree guard assembly according to another disclosed non-limiting embodiment.

With reference to FIG. 5, a tree guard assembly 20A according to another embodiment, may include corner sections 122A-122H that are also vertically assembled to a desired height (height of two shown). Each of the corner sections 122A-122H may be, for example, 16 inches×16 inches×30 inches.

Each corner section 122A-122H generally includes a first wall 130 and a second wall 140 that meet at a corner 150 such that the walls 130, 140 are approximately perpendicular to each other. The walls 130, 140 are each essentially rectangular.

The first wall 130 and the second wall 140 each include an opening configuration pattern 170, such as for example, an alternating rectilinear, e.g., rectangle, square, pattern. Although a particular pattern is illustrated it should be appreciated that other shapes, squares, triangle, circles, may be utilized as well as other patterns to provide air flow to the tree. In one example, a lower section band 172 five (5) inches in height, and an upper section band 174 three and one-half (3½) inches in height, for example, may be solid and provide a location for a logo or other identification (FIG. 5) as well as to, for example, contain mulch, keep out voles, and provide stability to the structure.

Figure 6:
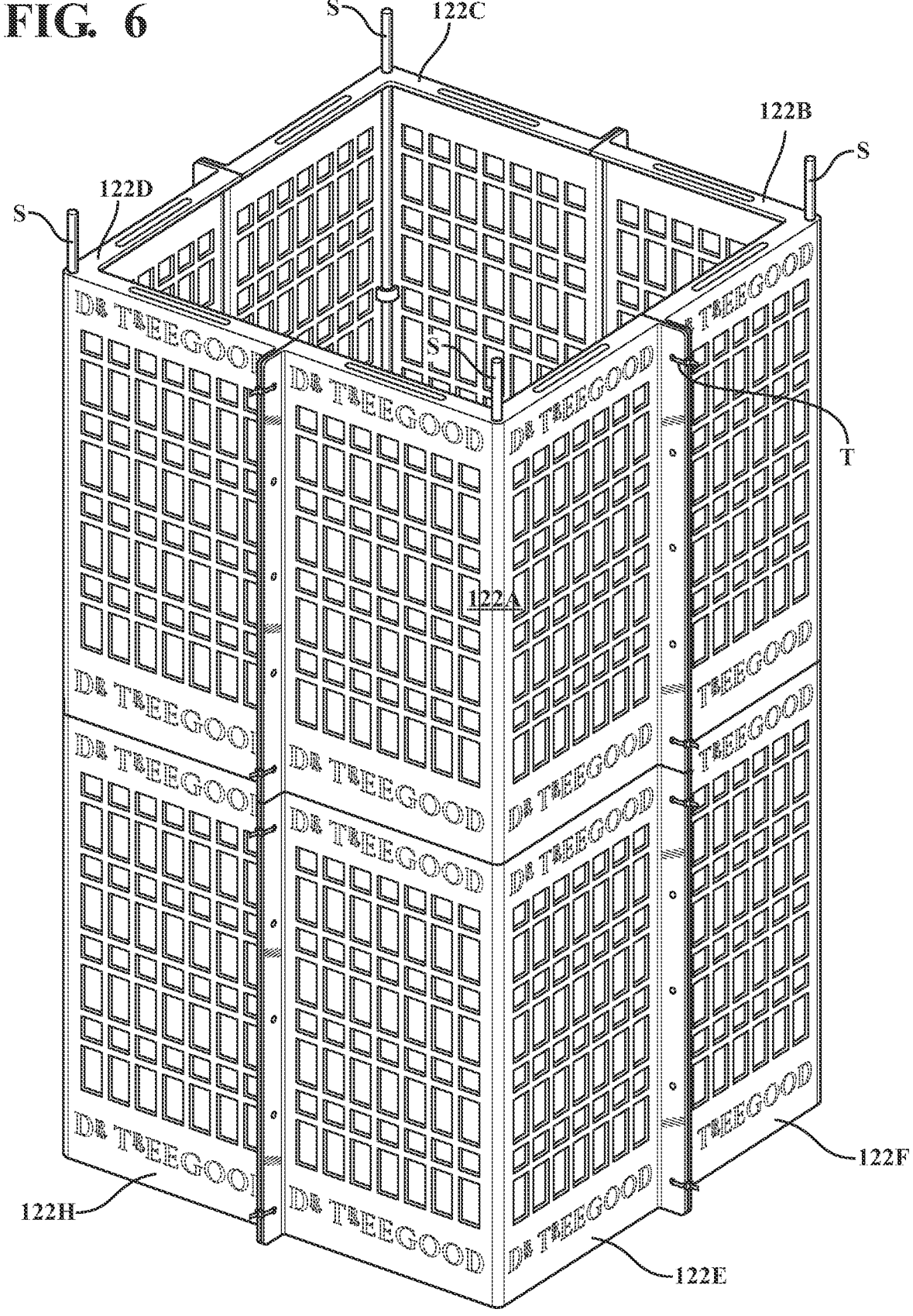
FIG. 6 is a perspective view of the tree guard assembly of FIG. 5 in an assembled configuration.

The first wall 130 and the second wall 140 each terminate with a respective flange 132, 142 that abut adjacent flanges of a respective adjacent corner section when assembled (FIG. 6). Each flange 132, 142 may include a multiple of flange apertures 160 (e.g., five (5) shown) along the length thereof to facilitate assembly.

An upper ledge 134 adjacent each upper of the walls 130, 140 and a lower ledge 144 adjacent each lower of the walls 130, 140 facilitate vertical assembly of the corner sections 122A-122H (FIG. 6) as well as structural rigidity. The ledges 134, 144 are transverse to the flange 132, 142 and extend inward with respect to the corner 150. The lower ledge 144 may further provide for the containment of mulch. The ledges 134, 144 may include slots 133, 143, or other features that may facilitate attachment together in the stacked arrangement. The slots 133, 143 may also provide an attachment point for straps tied to the tree for further support.

The tree guard assembly 20A may be adjustable to accommodate uneven terrain around the perimeter of the tree. That is, the multiple of flange apertures 160 allow for assembly of the corner sections 122A-122H such that the upper ledge 134 of one of the corner sections 122A-122H need not be parallel with the upper ledge 134 of adjacent corner sections.

Each corner 150 of corner sections 122A-122H may include an aperture arrangement 152 that extends parallel to the corner 150 to receive a stake S so that two or more corner sections 122A-122H may be stacked to a desired height (FIG. 6). That is the aperture arrangement 152 may include an aperture in the ledges 134, 144 as well as support 152A between the walls 130, 140.

The tree guard assembly 20 is readily assembled by a single person yet provides a rigid structure to protect trees and plants contained therein. The tree guard assembly 20 provides stability for the tree, provides protection from voles, rabbits, and deer, and also provides an area in which mulch may be neatly kept. The tree guard assembly 20 provides locations for stakes to support a young tree with stabilization. The tree guard assembly 20 provides an easy setup and take down reusable system. The tree guard assembly 20 provides an attractive confinement for the tree and mulch containment as well as ease of access to the tree during the first few years of the tree's growing period.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A portable tree guard assembly, comprising: a first plurality of four identical corner sections that are assembled to form a first structure, each of the plurality of corner sections comprise a first wall and a second wall that abut at a corner which forms an about 90 degree angle, the first wall and the second wall each comprise a respective flange that extends perpendicularly outward from a longitudinal edge of each wall opposite the corner, each flange extends outward with respect to an interior of the first structure, wherein each flange comprises a multiple of flange apertures such that adjacent corner sections of the first plurality of four identical corner sections are tied together via the multiple of flange apertures to assemble the first structure;

an upper ledge inward extending with respect to the interior of the first structure and adjacent an upper end of the first wall and the second wall of each corner section, and a lower ledge inward extending with respect to the interior of the first structure and adjacent a lower end of the first wall and the second wall of each corner section;

wherein the inward extending upper ledge and inward extending lower ledge of each corner section contain elongated slots that are configured to accommodate straps for tying to a tree;

wherein the inward extending upper ledge and inward extending lower ledge of each corner section contain a stake aperture at the corner where the first and second wall abut;

a stake support extends between adjacent first and second walls of each corner;

a stake is received inside the first structure by passing through the stake apertures and stake support in each of the corner section; wherein the stake extends parallel to the corner;

wherein each corner section of the first structure comprises a plurality of apertures in the first and second wall in a configured pattern of multiple shapes, the apertures positioned between a solid lower section band and a solid upper section band, the apertures substantially cover and vary in size along a height of the first and second wall; and a second plurality of four identical corner sections assembled to form a second structure identical to the first structure;

wherein when the second structure is vertically stacked onto the first structure the lower ledge on the second structure abuts an upper ledge of the first structure and stake apertures of the first and second structure align.

2. The assembly as recited in claim 1, wherein the multiple of shapes increase in size toward a middle section of each corner sections.

3. The assembly as recited in claim 1, wherein each respective flange that extends perpendicularly outward from the wall with respect to the corner is integral with the wall.

4. The assembly as recited in claim 1, further comprising a logo on the solid lower section band.

5. The assembly as recited in claim 4, further comprising a logo on the solid upper section band.

6. The assembly as recited in claim 1, wherein each of the plurality of corner sections are storable together in a stacked configuration.

7. The assembly as recited in claim 1, wherein the multiple of flange apertures permit assembly of the four identical corner sections such that the upper ledge of one of the corner sections need not be parallel with the upper ledge of adjacent corner sections to accommodate uneven terrain.

8. The assembly as recited in claim 7, wherein the multiple of flange apertures are seized to receive a removable fastener.

9. The assembly as recited in claim 8, wherein the removable fastener comprises a zip tie.

10. A method of assembling a portable tree guard assembly, comprising: assembling a first plurality of four identical corner sections to form a first structure, each of the plurality of corner sections comprise a first wall and a second wall both abut at a corner which forms an about 90 degree angle, the first wall and the second wall each comprise a respective flange that extends perpendicularly outward from a longitudinal edge of each wall opposite the corner, each flange extends outward with respect to an interior of the first structure, wherein each flange comprises a multiple of flange apertures;

connecting adjacent corner sections of the first plurality of four identical corner sections by tying together via the multiple of flange apertures to assemble the first structure;

providing an upper ledge inward extending with respect to the interior of the first structure and adjacent an upper end of the first wall and the second wall of each corner section, and providing a lower ledge inward extending with respect to the interior of the first structure and adjacent a lower end of the first wall and the second wall of each corner section;

wherein the inward extending upper ledge and inward extending lower ledge contain elongated slots that are configured to accommodate straps for tying to a tree;

providing a stake aperture in each of the inward extending upper ledge and inward extending lower ledge at the corner where the first and second wall abut of each corner section;

positioning a stake inside the first structure through the stake apertures in each of the corner sections and through a stake support that extends between the adjacent first and second walls of each corner section; wherein the stake extends parallel to the corner;

providing each corner section of the first structure with a plurality of apertures in the first and second wall in a configured pattern, the apertures positioned between a solid lower section band and a solid upper section band, the apertures substantially cover and vary in shape and size along a height the first and second wall;

providing and securing a second plurality of four identical corner section at a respective flange of each of the plurality of corner sections to form a second structure identical to the first structure; and vertically stacking the second structure onto the first structure such that a lower ledge on the second structure abuts the upper ledge of the first structure.

11. The method as recited in claim 10, wherein securing comprises zip tying.

* * * * *